March 10, 1964
P. D. GROVER
3,124,009
MOTION CONVERTING DEVICE
Filed Sept. 28, 1961
3 Sheets-Sheet 1
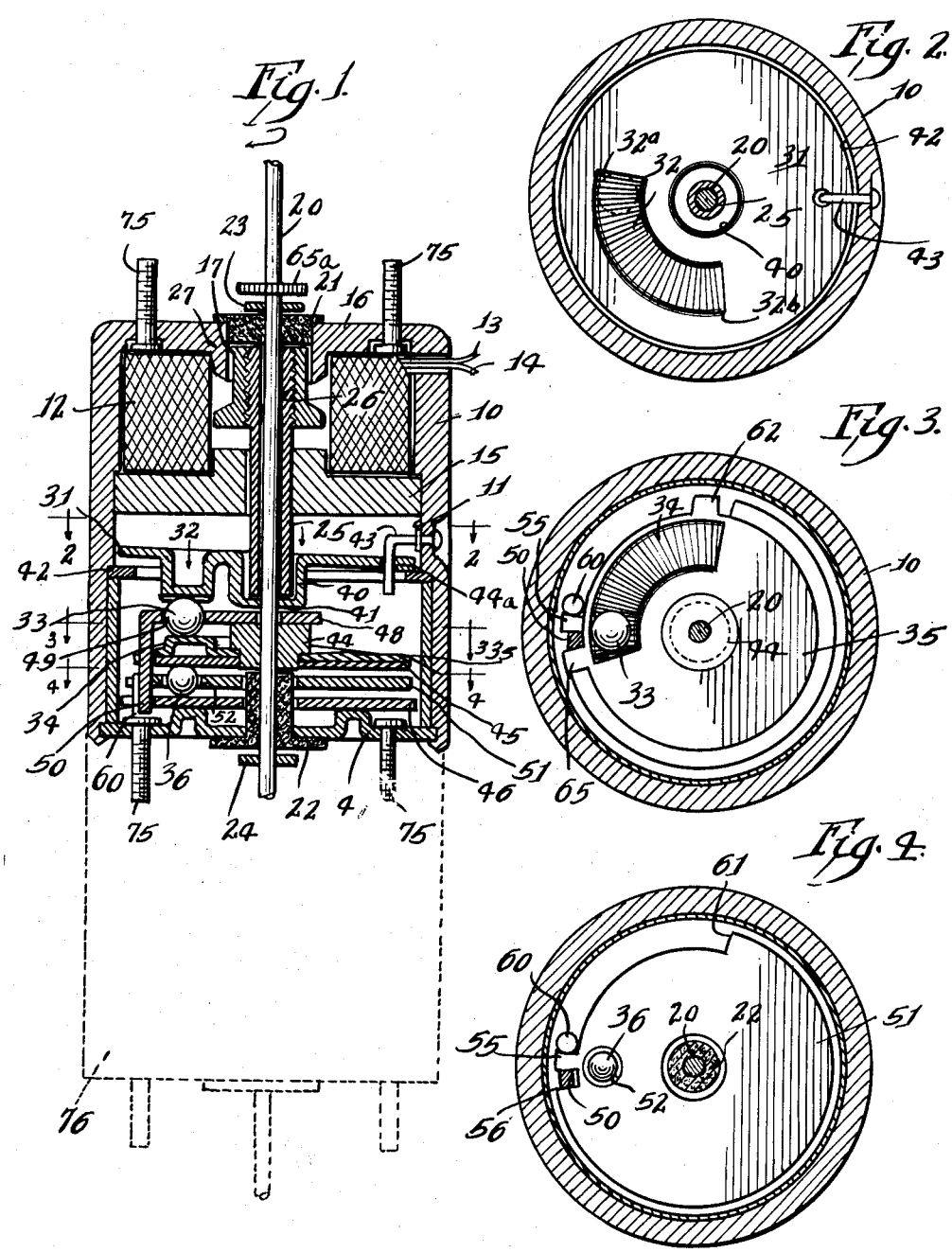
Inventor.
Philip D. Grover.
By Hofgren, Brady,
Wegner, Allen & Stellman
Attorneys.

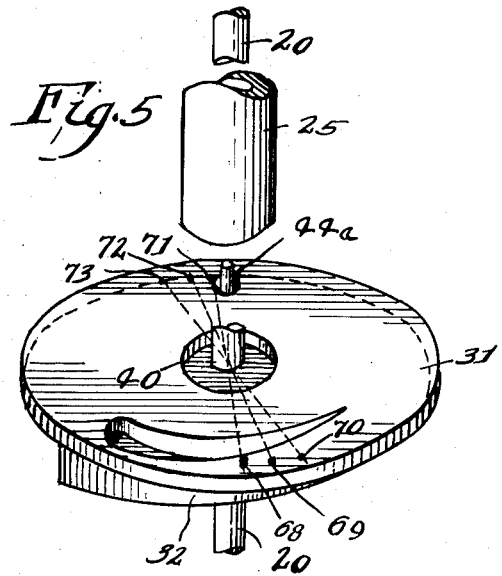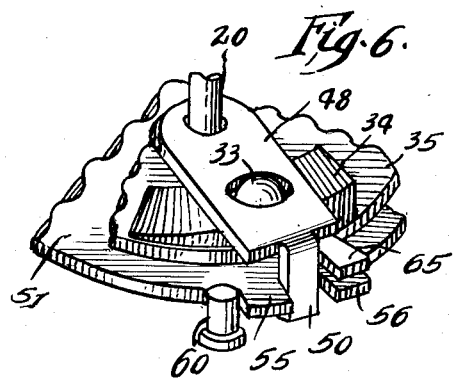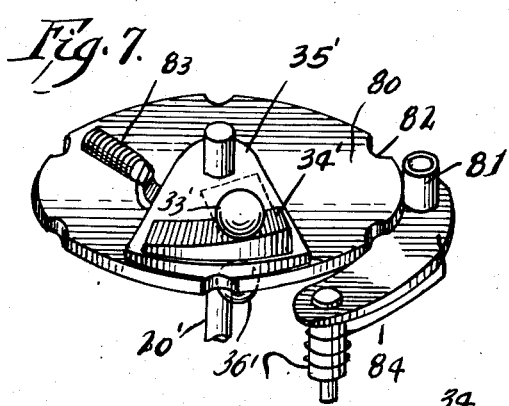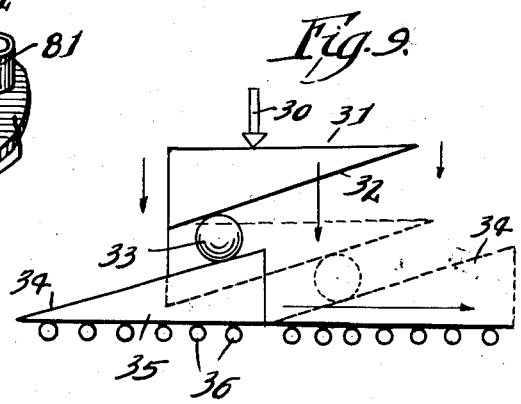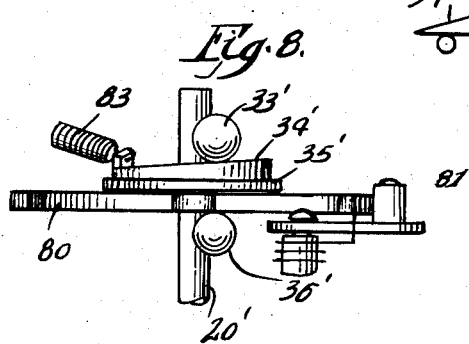

United States Patent Office 3,124,009
Patented Mar. 10, 1964

3,124,009
MOTION CONVERTING DEVICE
Philip D. Grover, Chicago, Ill.
(3507 Glenwood Ave., Two Rivers, Wis.)
Filed Sept. 28, 1961, Ser. No. 141,346
20 Claims. (Cl. 74—99)

This invention relates to a motion converting device for converting linear to rotary motion, and more particularly to a rotary solenoid.

An object of this invention is to provide a new and improved motion converting device providing an increased amount of rotation which is pure rotary movement without any linear component.

Another object of the invention is to provide a rotary solenoid in which the structure is assembled from a number of relatively simply formed parts which are inherently sealed to remain dust-free and more reliable in operation, and which separates the magnetic structure from the motion converting mechanism whereby the latter mechanism may embody hardened long wearing parts rather than relatively soft parts needed for part of a magnetic circuit.

Another object of the invention is to provide a motion converting device in which a rotor is mounted on an output shaft for pure rotary movement, an actuating member is arranged in spaced relation to the rotor and inclined relative thereto, a rolling member is disposed between the actuating member and the rotor whereby as force is applied to the actuating member, rotation of the rotor results. Further with respect to this construction, a second rolling member is associated with the rotor in support thereof to resist the force applied thereto by the first rolling member, with the two rolling members being in alignment and maintained in this alignment by rotatable retainer members connected together for rotation together and relative movement toward and away from each other.

Another object of the invention is to provide a device as defined in the preceding paragraph, in which the force is applied to the actuating member from a solenoid having an armature which is disposed for tilting when the solenoid is energized with a pin transmitting movement of the armature to the actuating member eccentrically of the actuating member, and with the actuating member functioning as a variable ratio lever with a floating fulcrum point whereby the point of force application on the member aligns itself with a line between the fulcrum and the rolling member engaged by the actuating member.

A further object of the invention is to provide a rotary solenoid as defined in the preceding paragraphs, in which the increments of rotation derived from actuation of the solenoid may be used to successively step the rotor in which the construction embodies an intermediate member associated with the rotor in frictional engagement therewith which is caused to tightly engage the rotor when the actuating member moves toward the rotor to obtain movement of the rotor and, when the actuating force is released, means cause return of the intermediate member to its initial position, while other means maintain the rotor in its indexed position.

Still another object of the invention is to provide a rotary solenoid of the type described in the preceding paragraphs, in which as an alternate to having rotation of the rotor in excess of 360° and in fact approaching 720°, stop means can be provided for controlling the extent of rotation of the rotor and output shaft to any incremental distance of a lesser amount.

Still another object is to make a motion converting device that can be actuated by a solenoid either alternating current or direct current or by hydraulic, pneumatic or mechanical means, and in which a through shaft may extend through two similar units connected together by similar mounting means on both ends thereof in order to deliver either a clockwise or counterclockwise stroke to the driven unit.

Further objects and advantages will become apparent from the following detail description taken in connection with the accompanying drawings, in which:

FIGURE 1 is a vertical section taken through the rotary selonoid and with a duplicate unit for providing opposite rotation shown in broken line as an extension thereof;

FIGURE 2 is a section taken generally along the line 2—2 in FIGURE 1;

FIGURE 3 is a section taken generally along the line 3—3 in FIGURE 1;

FIGURE 4 is a section taken generally along the line 4—4 in FIGURE 1;

FIGURE 5 is a fragmentary perspective view of a part of the actuating mechanism of the structure shown in FIGURE 1;

FIGURE 6 is a perspective view of parts of the mechanism shown in FIGURE 1;

FIGURE 7 is a fragmentary perspective view of a modification of the significant structure of the rotary solenoid for obtaining a stepping action;

FIGURE 8 is a side elevational view of the structure shown in FIGURE 7,

FIGURE 9 is a schematic view showing the action of the motion converting mechanism;

Figure 10:
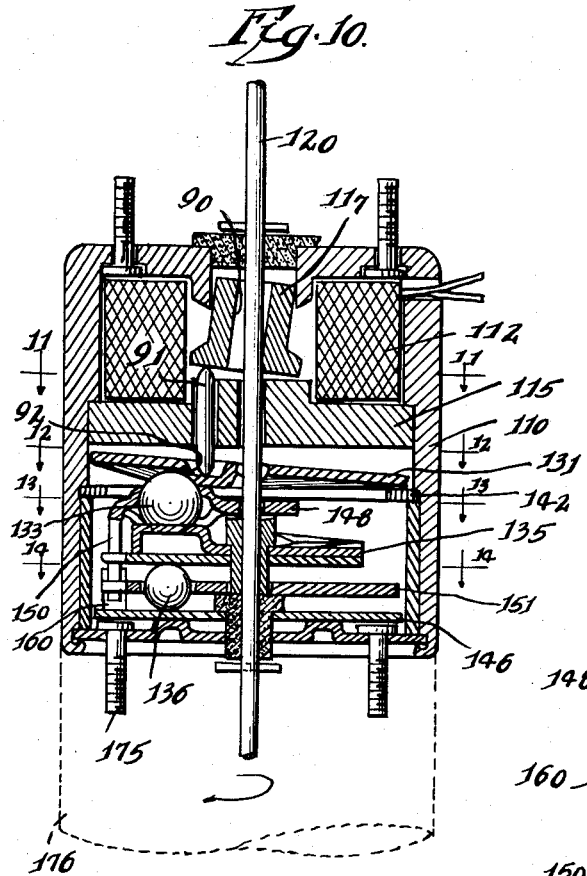
FIGURE 10 is a vertical section of another embodiment of the inventon.
Figure 12:
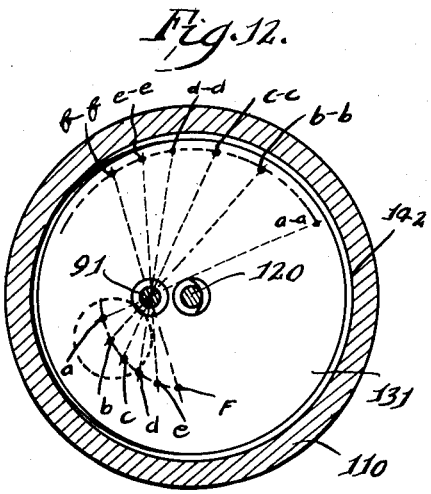
FIGURE 12 is a section taken generally along the line 12—12 in FIGURE 10.
Figure 13:
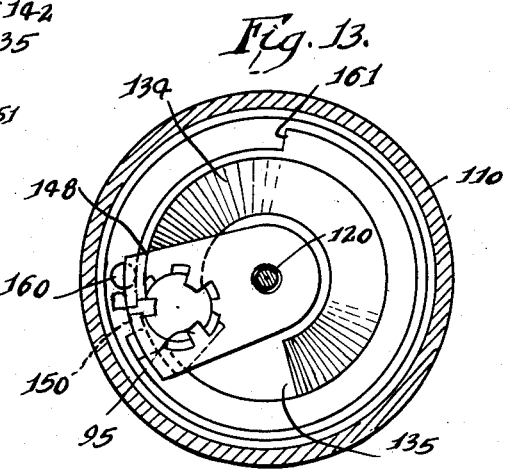
FIGURE 13 is a section taken generally along the line 13—13 in FIGURE 10.
Figure 11:
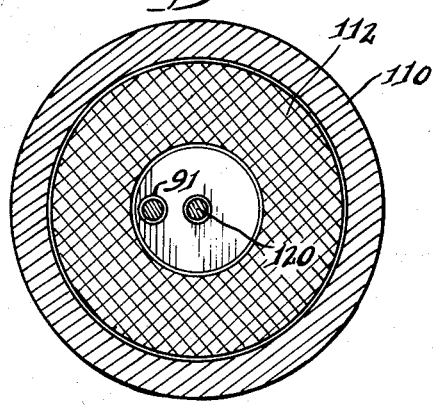
FIGURE 11 is a section taken generally along the line 11—11 in FIGURE 10.
Figure 14:
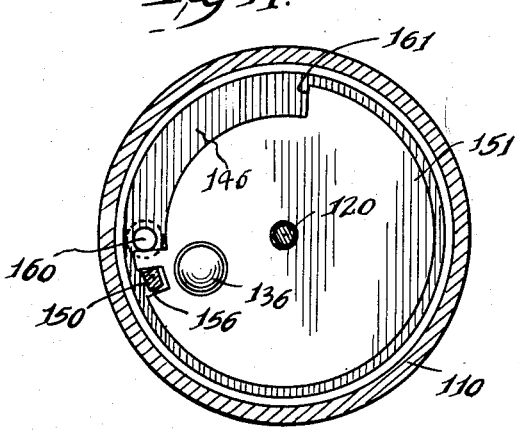
FIGURE 14 is a section taken generally along the line 14—14 in FIGURE 10.

While this invention is susceptible of embodiment in many different forms, there is shown in the drawings and will herein be described in detail an embodiment of the invention together with a modification thereof, with the understanding that the present disclosure is to be considered as an exemplification of the principles of the invention and is not intended to limit the invention to the embodiment illustrated. The scope of the invention will be pointed out in the appended claims.

The motion converting device in the form of a rotary solenoid is shown in one embodiment in FIGURES 1–6, in which a casing 10 has a generally cylindrical interior 11 in which a D.C. solenoid coil 12 is located at one end thereof, the coil being connected in a suitable circuit by wires 13 and 14. Associated with the coil is a backstop plate 15 press-fitted into the interior of the casing and spaced from an end 16 of the casing and an armature 17 disposed centrally within the annular coil and movable downwardly in response to energization of the coil. The casing 10, the backstop 15, and the armature 17 are of magnetically permeable material whereby a magnetic circuit passes therethrough, when the coil is energized, to cause downward movement of the armature 17 as viewed in FIGURE 1.

An output shaft 20 is disposed centrally of the foregoing elements and is rotatably mounted in the casing 10 by a pair of bearings 21 and 22 at the top and bottom of the casing as viewed in FIGURE 1. This output shaft is held in longitudinal position by a pair of washers 23 and 24 and movably receives thereon an actuating tube or sleeve 25 which at its upper end is threadably attached to the interior of the armature 17, as indicated at 26. There is a loose fit between the actuating tube 25 and the output shaft 20, whereby the tube may freely shift axially of the output shaft and the output shaft may rotate relative to the tube. The armature 17 is to coact with a downturned edge 27 of the casing 16 to provide a magnetic flux path which permits the magnetic lines of force to flow into the moving armature so that they are cut in shear as the armature descends. This permits satisfactory operation of the solenoid while obtaining a sealed cover structure by the association of the bearing 21 with the end 16 of the casing.

The foregoing structure provides means for obtaining a linear movement in response to an actuating force, and it will be seen that the force may be imparted to the sleeve 25 by either an alternating or direct current solenoid or mechanical means including hydraulic and pneumatic actuation. This linear movement is converted to rotary movement of the output shaft 20 by structure to be subsequently described.

At the outset, reference may be made to FIGURE 9 which shows the operation schematically with the actuating force indicated by the arrow 30 applied to a member 31 with a sloped surface 32. This member may be flat and tilted to provide the slope as seen in the embodiment of FIGURE 10. The resultant forces cause a rolling member 33, shown in the form of a ball, resting against a sloped surface 34 of a member 35, to roll. As a result of this rolling action, the member 35 shifts to the broken line position shown in FIGURE 9. At the completion of the downward force of actuation, the parts will be in the position shown in broken line in FIGURE 9. In effect, the ball 33 functions by means of friction but acts as a gear, and the sloped surfaces 32 and 34 act as racks. Anti-friction means is provided by a second rolling member, or members, in the form of one or more balls 36 having a variety of positions as shown in FIGURE 9, which provides a reaction member to the force exerted by the downwardly acting member 31 and balances off the forces exerted on the lower member 34 whereby there is no binding action. When the upper member 31 is moved downwardly the balls 33 and 36 are caused to rotate and they move bodily toward the right, as viewed in FIGURE 9, at a rate less than the moved member 34. It will be noted that the action described in respect to FIGURE 9 will occur even though the member 35 does not have the slope 34; however, the addition of this slope, which matches the slope of the surface 32 on the actuating member 31 results in there being a parallel relation so that there can be no slippage of the ball 33 relative to the surfaces with which it engages.

As will be noted and will become more evident in the ensuing description, there is no practical limit to the rotation that may be given to the actuated member 35 except for the limit of cam surface or slope provided on the actuating member 31. Thus, with a substantially 360° length of slope or cam 32 on the actuating member 31, the actuated member 35 may have an amount of travel close to two times the length of the cam and thus approximating 720°. Further, the movement of the actuated member 35 is a pure rotary movement without any linear component of movement.

Referring now to FIGURES 1 through 6, the actuating member 31 is disclosed as a generally circular wobble plate having a central depression 40 with an opening 41 for loosely receiving the output shaft 20 and into which the lower end of the actuating tube 25 extends. Additionally, the wobble plate has a cam slope on the underside thereof previously referred to as 32, which in the embodiments shown has an arc of something in excess of 90° with the cam 32 being depressed the deepest at an end 32a thereof and gradually inclining upwardly to its terminus indicated at 32b, and as from left to right, as shown in FIGURE 2. The wobble plate 31 has a travelling fulcrum point as provided by the resting of a peripheral edge thereof on a surface within the interior of the casing 10 as provided by a ring washer 42 mounted within the casing. The wobble plate is held against rotation and to maintain the cam in the right orientation by a bent rivet 43 secured to the casing and passing through an oversized opening 44a in the wobble plate 31 which does not prevent tilting. As previously described, the rolling member in the form of a ball 33 engages the cam slope 32 and rests on the slope 34 of a rotor plate which corresponds to the actuated member 34 referred to in FIGURE 9. This rotor plate 35 is affixed to a bushing 44 secured to the output shaft 20 whereby rotation of the rotor plate 35 results in rotation of the output shaft. Additionally, the bushing is affixed to a hardened wear plate 45 against which the second ball 36 engages. A second hardened wear plate 46 is disposed beneath the ball 36 and supported on an annular upstruck part of a casing wall 47. It will thus be seen that as the solenoid operates the actuator sleeve 25, the wobble plate is pivoted downwardly as a lever to cause rolling movements of the balls 33 and 36 with the rotor plate 35 in position therebetween.

In order to maintain the balls 33 and 36 in radial position, ball retainers are provided in the preferred construction (in lieu of circular ball races) which pivot around the axis of rotation. They may be interlocked to rotate together to insure the vertical alignment of the balls 33 and 36, as shown, in which a generally L-shaped upper retainer 48 is loosely mounted on the output shaft and has an opening 49 to receive the ball 33 and has a downwardly extending leg 50 extending down to the level and beneath a second retainer plate 51 having an opening 52 to receive the lower ball 36. Thus the upper and lower retainers may be held together for rotation and may permit up and down movement one to the other as is necessary. This is obtained by having the upper retainer leg 50 captured in a notch in the lower retainer plate 51 as formed by lug 55 of the lower retainer plate and an adjacent surface 56 thereof as shown in FIGURE 4.

The retainers illustrated, in addition to maintaining the vertical alignment of the balls, also permit relatively simple cam tracks on the wobble plate and the rotor which can be flat since the retainers function to provide radial and circumferential retention of the balls.

As stated previously, if the cams 32 and 34 have a substantially 360° arc, then the rotation of the output shaft 20 would closely approximate 720°. In the embodiment shown, the cam surfaces are slightly in excess of 90° of arc to provide for less than one complete rotation of the output shaft, and means are provided to accurately control the extent of rotation imparted to the shaft. This means comprises a stop pin 60 extending upwardly within the casing which establishes an initial position for the parts and which, after 180° of rotation of the output shaft, will be engaged by a surface 61 on the lower retainer plate which will have travelled approximately 90°, since the rotation of the lower retainer plate 51 is half that of the total rotation of the output shaft. The rotor plate 35 which is affixed to the output shaft will be stopped after 180° of rotation by a lug 62 thereon which will engage the downwardly extending leg 50 of the upper ball retainer plate. Although as shown in FIGURES 3 and 4, these parts are approximately 90° apart, there will actually be 180° of rotation of the output shaft before the engagement, since the downwardly extending leg 50 of the upper retainer plate will travel half as far as the lug 62 and they will only engage after 180° of rotation.

After each cycle, the parts return to the normal initial position by a return force from the driven mechanism with which the device is associated, or by means of a clock spring 65a secured to the output shaft 20 as shown in FIGURE 1. The parts are held in initial position by engagement with the pin 60. This is accomplished by having the projection 55 on the lower retainer plate engage the stop pin 60, as shown in FIGURE 4, and by having the upper retainer plate 48 keyed thereto through the downwardly extending leg 50 and further the rotor 35 has a lug 65 (FIGURE 3) which also engages against the downwardly extending leg 50 of the upper ball retainer plate. The lugs 62 and 65 on the rotor 35 are at a level above the top of the stop pin 60 whereby they may pass freely over the stop 60.

The interaction of these members is best seen in FIG. 6, a fragmentary view of the pertinent members. The clockwise bias returning the mechanism to starting position for the next power stroke is applied through plate 35. Projection 65 thereon engages the downturned leg 50 of the upper ball retainer member, urging it in a clockwise direction. As this downturned member 50 also engages the mating surface of projection 55 on the lower ball retainer, this member also is urged in a clockwise direction until the opposite surface of projection 55 engages stop pin 60. Hence all rotating members are positively urged by spring bias into the correct, oriented positional relationship for the start of a new power stroke in a counterclockwise (as viewed in FIGURE 6) direction.

It will be noted that as the member 35 and its projection 65 move twice as fast, and twice as far as the ball retaining members in a clockwise direction, projection 65 will move away from the downturned leg 50 and that with a cam slope adapted for more than 360° of rotation, the member 65 must pass over the top of stop pin 60. Surface 61 on the lower retainer 51 similarly limits forward rotation. Similarly projection 62 in FIG. 3 would engage the downturned leg 50 to limit the forward position of the rotor member 35. For mechanisms designed to rotate less than 360°, it is contemplated that the rotor could be stopped directly by a downturned projection engaging the stop pin 60, if desired, rather than through the intermediary means described.

The wobble plate 31 and its action are shown in FIGURE 5, in which it will be noted that during a cycle of operation, although the wobble plate is held against rotation, the ball 33 moves progressively along the cam surface between points 68, 69 and 70. With the point of force application to the wobble plate derived from the sleeve 25 being generally centrally of the wobble plate, the fulcrum point for the wobble plate shifts to maintain a generally straight line between the point of ball contact, the point of force application and the fulcrum, with the fulcrums being shown at 71, 72 and 73, respectively. The wobble plate 31 effectively functions as a lever with the length of stroke derived from the solenoid being amplified by the lever means. A depressed central area 40 of the wobble plate permits the point of force application to at all times be beneath a line between the point of contact with the ball 33 and the washer 42, providing a fulcrum for the lever to make certain that the wobble plate may at all times act fully on the ball.

Suitable mounting screws for attaching the unit are indicated at 75 at each end of the unit, with one of the mounting screws having the stop pin 60 formed as part thereof. Mounting on one end will give a power stroke in a clockwise direction on the driven mechanism, and reversing the unit, end to end and mounting on the other set of studs will give a counterclockwise power stroke to the driven mechanism. If it is desired to have a unit in which the output shaft 20 can have a power stroke, selectively in either direction, it is only necessary to add a second unit as shown in broken line in FIGURE 1 and indicated at 76, having another solenoid and motion converting mechanism as described herein, face-to-face, and with the output shaft 20 extending therethrough.

A second embodiment of the invention is shown in FIGURES 7 and 8 in which the mechanism may be embodied as a continuous stepper and in which the rotor will be advanced a given number of degrees for each pulse of the solenoid. This has particular usage in stepping rotary switches where an axially mounted and driven common contact progresses around an insulated disc carrying contact points. In this form, like parts have been given similar reference numerals with a prime (') affixed thereto. The rotor plate 35' rotates freely about the output shaft 20' and is shown as a sector with a cam slope 34'. A rolling member 33' engages therewith and is actuated similarly to the form shown in FIGURE 1. A disc 80 is affixed to the output shaft 20' and is positioned beneath the rotor 35', and a ball 36' provides for reaction support. A spring-urged detent 81 is arranged to engage in successive notches 82 of the disc 80 to hold the disc in a position of advance.

When a force is applied to the wobble plate, the rotor 35' is pressed down against the disc 80 to effect a firm engagement therewith, and the disc is rotated, forcing release of the detent 81. At the end of the arc of rotation of 35' and 80, the detent 81, urged by the bias of spring 84, drops into a holding position in a disc notch 82. The vertical pressure of the actuating member is released, when the solenoid is deactivated, and the rotor 35' is rotated in a backward direction relative to the disc 80. This reverse rotation is caused by a spring 83 connected between the casing and the rotor disc 35' which also is at a slight upward inclination relative to the rotor whereby the spring also acts to separate the rotor 35' from the disc 80 to permit free rotation thereof on return of the rotor. Rotation limiting means of rotor 35 are similar to those illustrated in FIG. 6, but are omitted for clarity.

Another embodiment of the invention is shown in FIGURES 10–14 in which parts similar to those shown in the first embodiment are given similar reference numerals, with the numeral 1 preceding, to have the numbers in the 100 series. In the form of FIGURES 10–14, the armature 117 has a greatly enlarged opening 90 whereby the armature may be inclined, as shown in FIGURE 10, to coact with a force transmitting member in the form of a pin 91 passing through the backstop 115 into engagement with the wobble plate 131, and specifically a depressed area 92 which is offset from the center of the wobble plate. This gives a lever action to movement of the armature providing for increased force transmission to the wobble plate. Another significant feature of this construction is that the wobble plate 131 may have no predetermined cam surface on the underside thereof but may be merely flat, as shown in the embodiment, with the inclination of the plate varying during a cycle to always engage behind the ball and cause rotation of the output shaft 120. This wobble plate construction also provides a consistently varying ratio lever means as will be evident in examining FIGURE 12 in which, during the cycle, successive points of contact on the ball 133 by the wobble plate are shown at points a through f, with the corresponding travelling fulcrum points for the wobble plate being shown at a—a through f—f, respectively. As the engagement progresses along the line from a to f, the lever ratio from the point of force application to the fulcrum as compared to the point of ball engagement to the fulcrum, varies. As with the embodiment of FIGURE 1, the point of contact of the wobble plate with the ball 133 should be beneath the line between the point of fulcrum and the ball engagement to obtain a stable lever action. In this form, the wobble plate 131 is not keyed, since the actuator pin 91 serves this function to prevent rotation of the wobble plate, and as is evident in FIGURE 12, the line of the force is applied to the ball.

It should be noted that with a constant force on pin 91 the lever ratio changes to give a strong force at the beginning of the cycle, or start position, and this force decreases up to 180° of ball and ball retainer rotation (or 360° of rotor rotation). Beyond 180° of ball and retainer rotation, the ratio will increase the force on the ball as it progresses. Hence up to a 360° arc of rotor (output shaft) rotation, this ratio change will tend to offset the gradually increasing force obtained from the armature in a direct current solenoid, which varies in force inversely as the square of the distance of the closing gap, and will tend to make the output torque more closely approach a linear function.

As a further modification, the upper retainer plate 148 has a series of fingers struck both upwardly and downwardly from the retainer plate to capture the upper ball 133. These fingers are indicated at 95.

I claim:

1. In a motion converting device, an output member having rotary movement without any axial movement, an input member having axial movement without rotary movement, and means intermediate said members for converting the axial movement of the input member to rotary movement of the output member comprising, a rolling member in rolling engagement with the output member, and a sloped lever member in rolling engagement with the rolling member and having a remote fulcrum, said input member engaging said sloped lever member between said fulcrum and said point of rolling engagement.

2. In a motion converting device, a rotatable output shaft, an output member connected to said output shaft for rotation therewith, an actuator member spaced from said output member and mounted for movement toward and away from the output member, a raised cam surface on one of said members, a rolling member disposed between the members and in rolling engagement with the cam surface, means engageable with the actuator member for urging the actuator member toward the output member, a second rolling member engageable with the output member at the side opposite from and aligned with the first mentioned rolling member to balance the forces exerted on the output member, and a pair of retainers one for each of said rolling members mounted for rotation about the output shaft, and a connection between said retainers causing rotation thereof together while permitting movement of the retainers toward and away from each other.

3. A motion converting device, as defined in claim 2, including means disposed adjacent said retainers for engagement by a retainer to limit rotation of the retainers.

4. In a motion converting device, a rotatable output shaft, an output member connected to said output shaft for rotation therewith, an actuator member spaced from said output member and mounted for movement toward and away from the output member, a cam surface on one of said members, a rolling member disposed between the members and in rolling engagement with the cam surface, means engageable with the actuator member for urging the actuator member toward the output member, an annular ledge within a casing for the device, said actuator member being disc-shaped with the periphery of the disc overlying the ledge and having said cam surface on a face thereof, whereby engagement of a rolling member with the cam surface causes a tilt of the actuator member to have a part of said periphery engage said ledge, said urging means loosely engaging the actuator member whereby the location of engagement of the actuator member with the ledge shifts as the rolling member moves along the cam surface.

5. A motion converting device, as defined in claim 4 in which said urging means is located unsymmetrically with respect to said ledge and said location of engagement shifts to maintain the engagement of the urging means with the actuator member generally on a line between said location and the rolling member.

6. A rotary solenoid for converting axial solenoid induced movement to pure rotary movement, a casing, an output shaft with an end, a rotor plate affixed to said output shaft, a wobble plate non-rotatably mounted in said casing with a surface thereon sloping toward the rotor plate, a rolling member between said wobble plate surface and the rotor plate, means on said casing remote from said wobble plate surface defining a fulcrum for said wobble plate, a solenoid with a movable armature, and means for transmitting movement of the armature axially of the output shaft to the wobble plate intermediate said fulcrum and said wobble plate surface whereby tilting of said wobble plate induces rotation of the rotor plate resulting from movement of the rolling member.

7. A rotary solenoid, as defined in claim 6, including a second rolling member engageable with the rotor plate at the side opposite the first rolling member.

8. A rotary solenoid, as defined in claim 7, including a pair of retainers one for each of said rolling members mounted for rotation about the output shaft, and a connection between said retainers causing rotation thereof together while permitting movement of the retainers toward and away from each other.

9. A rotary solenoid, as defined in claim 8, including means disposed adjacent said retainers for engagement by a retainer to limit rotation of the retainers.

10. A rotary solenoid for converting axial solenoid induced movement to pure rotary movement, a casing, an output shaft within the casing with an end extending from an end of the casing, a rotor plate affixed to said output shaft within the casing, a wobble plate non-rotatably mounted in said casing sloping toward the rotor plate, a rolling member between the wobble plate and the rotor plate, a solenoid in an end of said casing with a movable tilted armature, loosely surrounding the output shaft, and a pin for transmitting rocking movement of the armature to the wobble plate at a distance from the center of the plate whereby rotation of the rotor plate results from movement of the rolling member.

11. A linear to rotary motion conversion mechanism, comprising, an output rotor, an inclined pressure applying member spaced from the rotor, a pair of rolling members one at each side of the rotor with one being between the rotor and the pressure applying member, and means movable independently of said rotor for maintaining the rolling members at all times with their centers along a line parallel to the rotation axis of the output rotor.

12. In a motion converting device, an output shaft, a rotor connected to said shaft, a substantially circular plate-like lever spaced from and inclined relative to said rotor, a rolling member between said lever and rotor, force applying means engaging said lever, means mounting the lever to have the fulcrum point travel to maintain alignment thereof with the point of force applying and the location of the rolling member.

13. A motion converting device as defined in claim 12 in which the point at which the force applying means engages the lever is at a level beneath a line between the fulcrum and the top of the rolling member.

14. In a motion converting device to convert linear and rotary motion, one to the other, linear motion means, a non-rotatable lever member pivotably engaged by said linear motion means on one side thereof, a first single rolling member engaging the other side of the lever member, a rotor member, a sloped surface on one of said members engaging said first rolling member, a second single rolling member engaging a non-sloped surface on the opposite side of said rotor member, and means maintaining said first and second rolling members axially aligned to balance out axial components of force and permit pure rotation of the rotor member.

15. A motion translation device including a supporting structure, a linear motion member, driving rolling means and support rolling means, a rotor member adapted for rotating about an axis engageably disposed between said rolling means, a generally circular lever engageably disposed between said linear motion member and said driving rolling means and tiltably supported by engagement with said driving rolling means and by a point of engagement with a surface on the supporting structure, such point of engagement constituting a moving fulcrum which will continuously and automatically align the fulcrum with a line through the points of engagement with the driving rolling means as it rolls through an arc and the point of engagement with the linear motion member thus permitting lever action with the driving rolling means at all positions about the axis of rotation.

16. A motion converting device as defined in claim 15, having a sloping cam surface on said circular lever.

17. A motion converting device comprising a supporting structure, a linear motion means, a rolling drive member, a circular lever engaging the rolling drive element, and a movable fulcrum point on the surface of the structure, a rotatable shaft, a rotor member affixed to the rotatable shaft engaging said rolling drive member, a rolling support element engaging said rotor member, rotatable retaining means for the rolling elements mounted to rotate freely about said rotatable shaft, said linear motion means being pivotably engaged with said circular lever at a point non-concentric with the locus of the moveable fulcrum of such lever, so that the distance between the points of engagement of said lever with the structure and the drive element continuously vary with the change in position of said rolling drive element to effect a changing ratio of leverage upon the rotor member.

18. A rotary solenoid for converting axial solenoid induced movement to pure rotary movement including a supporting structure, a solenoid affixed to said structure, rolling drive means and rolling support means, a rotatable output means extending from said structure, a rotor member affixed to said output means for rotation therewith engageably disposed between said rolling drive means and rolling support means, lever means with a fulcrum and engaging said rolling drive means with a sloped surface whereby rotation of the rotor results from movement of the rolling member when energized by solenoid.

19. A motion converting device for converting axial movement to rotary movement and imparting incremental advances to progressively rotate an output means, comprising an output shaft, a rotor member adapted for pure rotation affixed to said output shaft, an actuating member in the form of a lever with a fulcrum and a surface sloping relative to the plane of rotation of said rotor member, an intermediate member mounted to rotate freely about said output shaft having a sloped cam surface on said intermediate member which is in frictional engagement with said rotor member, a rolling member disposed between said actuating member and the cam surface of said intermediate member in rolling engagement with said members, means for holding the rotor member in the advanced position, means for returning the intermediate member to its initial position, and means engageable with the actuating member intermediate said fulcrum and the surface thereon for moving the actuating member toward the rotor plate to cause rotation of the intermediate member and the rotor member by frictional engagement.

20. A rotary solenoid comprising an enclosing housing, a solenoid input means, a motion converting device as defined in claim 19 with the output shaft extending from said housing to provide continuous progressive incremental rotation to said output shaft upon being energized by a series of electrical pulses.

References Cited in the file of this patent
UNITED STATES PATENTS

| | | |
|---|---|---|
| 2,828,636 | Hall | Apr. 1, 1958 |
| 2,928,289 | Maroth | Mar. 15, 1960 |
| 2,959,969 | Leland et al. | Nov. 15, 1960 |